United States Patent [19]

Yamazaki

[11] 4,058,807
[45] Nov. 15, 1977

[54] DIGITAL ANTILOGARITHMIC CONVERTER CIRCUIT

[75] Inventor: Masaru Yamazaki, Tokyo, Japan

[73] Assignee: Copal Company Limited, Tokyo, Japan

[21] Appl. No.: 677,418

[22] Filed: Apr. 15, 1976

[30] Foreign Application Priority Data

June 24, 1975 Japan .............................. 50-76539

[51] Int. Cl.² .......................................... H03K 13/20
[52] U.S. Cl. ............................................ 340/347 DA
[58] Field of Search ................... 340/347 DA, 347 M; 378/14; 235/197

[56] References Cited

U.S. PATENT DOCUMENTS 3,577,084   5/1971   Atcherson ..................... 340/347 DA
3,754,233   8/1973   Sutherland ..................... 340/347 DA
3,754,235   8/1973   Dummermuth ............. 340/347 DA

*Primary Examiner*—Charles D. Miller
*Attorney, Agent, or Firm*—Stevens, Davis, Miller & Mosher

[57] ABSTRACT

A digital antilogarithmic converter circuit converts digitally logarithmically converted digital information to its antilogarithm. The digital information to be converted is separated into the number to the right of the decimal point and the number to the left of the decimal point. The number less than the decimal point is digitally converted to a linear approximation of its antilogarithm. The number more than decimal point is digitally converted to its antilogarithm. Said linear approximation of the antilogarithm of the number less than the decimal point is digitally multiplied by said antilogarithm of the number more than the decimal point to obtain the antilogarithm of said digital information.

1 Claim, 4 Drawing Figures

DIGITAL ANTILOGARITHMIC CONVERTER CIRCUIT

FIELD OF THE INVENTION

This invention relates to a digital antilogarithmic converter circuit for converting a logarithm in a digital form to its antilogarithm also in a digital form.

DESCRIPTION OF THE PRIOR ART

In the prior art, a conversion of a logarithm to its antilogarithm has been effected analogically by means of an analog circuit comprising electron tubes, diodes, etc.

The known circuit is sufficient as the long as information to be converted comprises analog signals. But when logarithmic information to be converted is in the form of a digital signal which has been converted from an analog signal, the digital signal must be first converted back into an analog signal and then the logarithm in an analog form must be converted to an antilogarithm in an analog form, so that the previous conversion of the logarithmic information to the digital form is meaningless.

In processing of information from photometric systems of a camera, etc., a very wide range of quantities must be treated, but the required accuracy is relatively low and an error in order of 25% is permissible. Accordingly, it is advantageous from the point of view of circuit construction to digitally process the information which has been converted to a logarithmic form. In practice it is often required to also convert the logarithm into its antilogarithm. However, the digital conversion of logarithm information to its antilogarithm cannot be achieved by a simple circuit.

SUMMARY OF THE INVENTION

An object of this invention is to provide a simple circuit for digitally converting logarithmically converted digital information to its antilogarithm and to this end makes use of the following theory.

In the optical systems of a camera etc., it is common practice to express a measured light information in the form of $2^x$ and then process its logarithm $x$ having a base of 2 as a digital information signal. Therefore, the conversion of this information $x$ to its antilogarithm is to obtain $2^x$. It should be noted that $x$ includes positive and negative numbers. Now, in an equation $Z=2^x$, $x$ is divided into a number $p$ to the right of the decimal point and a number $Q$ to the left of the decimal point and the sign of $x$ is represented by S. Then Z can be expressed by $Z=2^{S(P+Q)}=2^{SP}\cdot 2^{SQ}$. Since $2^{SQ}$ can be linearly approximated by $2^{SQ}\approx 1 + SQ$ with an error of a few % as described hereinafter, it is sufficient for the optical systems of a camera, etc. to calculate Z in accordance with the above linear approximation $Z\approx 2^{SP}(1+SQ)$. This approximation means that $(1+SQ)$ is multiplied by $2^{SP}$, while a digital multiplication by $2^{SP}$ corresponds to a mere shift of a decimal point in $(1+SQ)$ to the left or the right in dependence on the sign S, so that such a digital operation can be achieved in a simple manner. Of course, the above mentioned approximation of antilogarithmic conversion is applied to a logarithm having a base other than 2.

Accordingly, this invention provides a digital antilogarithmic converter circuit for digitally converting logarithmically converted digital information to its antilogarithm comprising a first digital circuit for receiving a number less than the decimal point of the logarithmically converted digital information and producing a linear approximation of an antilogarithmic value of said number;

a second digital circuit for receiving a number more than the decimal point of said digital information and producing an antilogarithmic value of this number; and a third digital circuit for multiplying said linear approximation by said antilogarithmic value of the number more than the decimal point.

In a preferred embodiment according to this invention, said logarithmically converted digital information is represented by a binary number, said first and third digital circuits are combined in a circuit which comprises a series of logic circuits, a first set of input terminals which receive low-order $n$ bits representing the number less that the decimal point of the binary number and are connected to each of said logic circuits, a second set of input terminals, the successive one of which is connected to corresponding successive $n+1$ logic circuits, and a set of bit output terminals, each of which is connected to a respective one of the logic circuits, and said second digital circuit comprises a binary-decimal decoder which receives high-order bits representing the number more than the decimal point of the binary number to produce an antilogarithmic decimal number thereof at a corresponding one of output terminals, the successive one of the output terminals being connected to the successive one of the second set of input terminals, whereby binary bit outputs representing the linear approximation of the number less than the decimal point of the digital information are produced at bit output terminals of successive $n+1$ logic circuits selected by the output of the decoder.

This invention further provides a circuit for receiving a logarithmically converted digital information and producing a signal having a period in reverse proportion to antilogarithmic value of said digital information comprising:

a counter for counting a clock pulse of a predetermined frequency to provide various divided frequencies;

a data selector for receiving the number more than the decimal point of the digital input information and selecting a particular one of the various divided frequencies from said counter in accordance with the received number;

a divider for dividing the selected frequency from said selector to provide a signal having a period selected to the antilogarithmic value of the number more than the decimal point of the input information;

an AND circuit having two inputs connected to the input and output of said divider, respectively; and a presettable counter which is preset to the number less than the decimal point of the input information by a start signal and then receives as clock pulses the output pulses from said AND circuit to produce an output signal having a period in reverse proportion to the antilogarithmic value of the input information.

Figure 1:
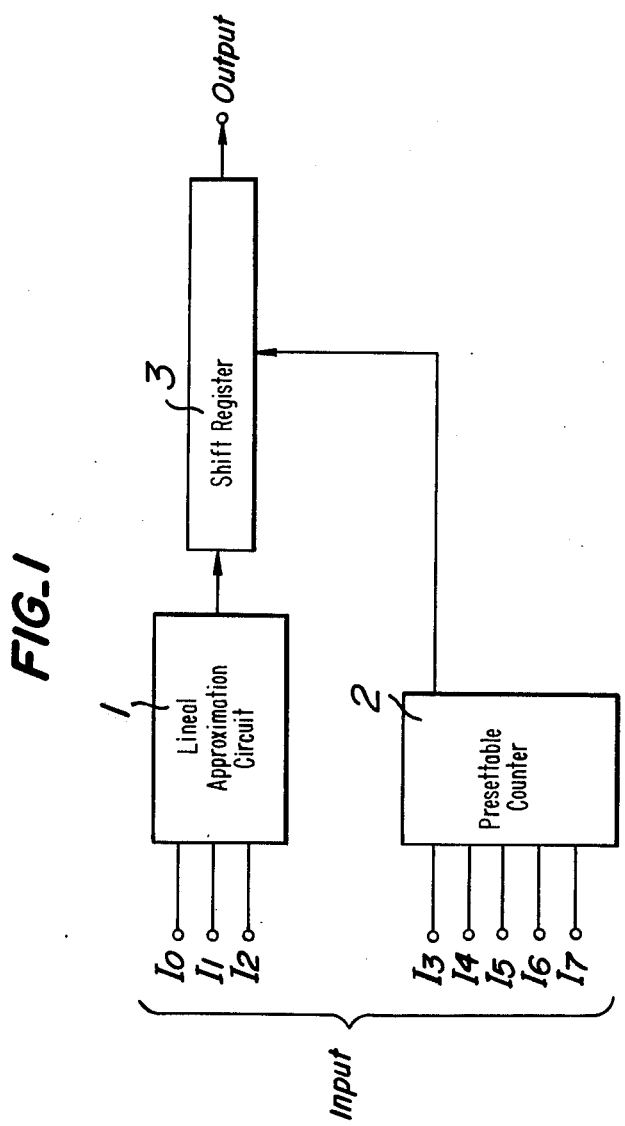
FIG. 1 is a block diagram of one embodiment of digital antilogarithmic converter circuit according to the present invention.

As previously mentioned, in the information processing of the photometric systems of a camera, etc., a very wide range of measured light information must be processed, but a relatively large error up to about 25% is permissible, so that for this information processing the measured information may be expressed in the form of $2^x$ by means of a suitable circuit and then only its logarithmically converted information $x$ need be digitally processed. However, $2^x$ is often required again. Accordingly, during the information processing it is desirable to use $x$ as the information to be processed, but lastly it is desirable to obtain $2^x$ as the final result.

This invention provides a very simple digital antilogarithmic converter circuit which is capable of converting $x$ to $2^x$ with error of a few %. Now, in order to facilitate the understanding of this invention, the theory of the antilogarithmic conversion according to the invention is explained again in more detail.

When the sign of $x$ is represented by S,
  the number more than the decimal point of $x$ is represented by P,
  the number less than the decimal point of $x$ is represented by Q, and
  $2^x = Z$ Z can be expressed by $Z = 2^x = 2^{S(P+Q)} = 2^{SP} \cdot 2^{SQ}$.

This expression means that $2^{SQ}$ is multiplied by $2^{SP}$, while a digital multiplication of a binary number by $2^{SP}$ corresponds to a shift of a decimal point to left or right by $p$ digits and can be effected by means of a simple circuit, so that a circuit for multiplying $2^{SQ}$ by $2^{SP}$ can be realized in a simple manner.

$2^{SQ}$ can also be calculated simply as explained below.

At first, a method for calculating $y = 2^r (1 > r > 0)$ in a simple manner is explained.

The most simple expansion of $y = 2^r$ is $y \approx 1 + r$. The relative errors $$(1 - \frac{r+1}{2^r}) \times 100$$

for this approximation are shown in Table I.

Table I

| r | r + 1 | $2^r$ | $(1 - \frac{r+1}{2^r}) \times 100$ |
|---|---|---|---|
| 0.00000 | 1.00000 | 1.00000 | 0.00000 |
| 0.10000 | 1.10000 | 1.07177 | −2.63363 |
| 0.20000 | 1.20000 | 1.14870 | −4.46607 |
| 0.30000 | 1.30000 | 1.23114 | −5.59281 |
| 0.40000 | 1.40000 | 1.31951 | −6.10016 |
| 0.50000 | 1.50000 | 1.41421 | −6.06602 |
| 0.60000 | 1.60000 | 1.51572 | −5.56063 |
| 0.70000 | 1.70000 | 1.62450 | −4.64727 |
| 0.80000 | 1.80000 | 1.74110 | −3.38285 |
| 0.90000 | 1.90000 | 1.86607 | −1.81848 |
| 1.00000 | 2.00000 | 2.00000 | 0.00000 |

From Table I it is apparent that the maximum error of this simple approximation is about 6%, so that in the photometric systems of a camera, etc., $2^{SQ}$ may be approximated to $1 + Q$, if S is positive.

Moreover, if S is negative, $Z = 2^{SP} \cdot 2^{SQ}$ can be converted to $Z = 2^{SP-1} \cdot 2^{SQ+1}$ so as to make positive the term $SQ + 1$ less than the decimal point of $x$.

Accordingly, if an error of a few % is allowed, the circuit for calculating $2^{SQ}$ can be realized in simple manner. In order to increase the accuracy, a more accurate approximation $y \approx 1 + ar$ may be used. In this case the optimum value of $a$ is about 0.95 and the maximum relative error is lowered to 2.5%. However, for this purpose a circuit for multiplying $r$ by 0.95 is required.

The embodiment of this invention for performing the above mentioned operation will now be explained with reference to the accompanying drawings.

The number $x$ includes either a positive or negative sign in a numerical expression, but in practice the number $x$ can be converted to a constantly positive number $x' = x + x_S$ by adding to the number $x$ an integral number $x_S$ smaller than the minimum value of the number $x$, so that it is possible to construct the circuit for processing only the positive numbers. Therefore, in the embodiments shown in FIG. 1 and FIG. 2 and described hereinafter, instead of the number $x$ the positive number $x'$ (the decimal point of $x'$ is shifted in positive direction by $x_S$ from that of $x$) is used as an input to be processed.

The input digital information $x'$ to be converted is assumed to be a binary number of 8 bits, the high-order five bits which represent the number more than decimal the point and the low-order three bits which represent the number less than the decimal point of $x'$. In FIG. 1 which shows a first embodiment of this invention, 1 is a first digital circuit which receives the low-order three bits "a b c" of the input $x'$ at input terminals $I_2-I_0$ and produces binary output "1 a b c" representing the linear approximation of the number of less than decimal point of input $x'$, 2 is a second digital circuit comprising a presettable counter which is presetted to the high-order five bits of the input $x'$ at input terminals $I_3-I_7$ and produces the same number of pulses as the antilogarithmic number of the number more than the decimal point of the input $x'$ and 3 is a third digital circuit comprising a shift register which is connected to the first and second digital circuits. These circuits are controlled by means of a suitable control circuit (not shown) and the binary output of the approximation circuit 1 is transferred to the shift register and then shifted therein by means of the shift pulses from the counter 2 so that the binary output is shifted by the same number of digits as that of the shift pulses. This means that the linear approximation of the antilogarithm of the number less than the decimal point of the input $x'$ is multiplied by the antilogarithm of the number more than the decimal point of the input $x'$.

Figure 2:
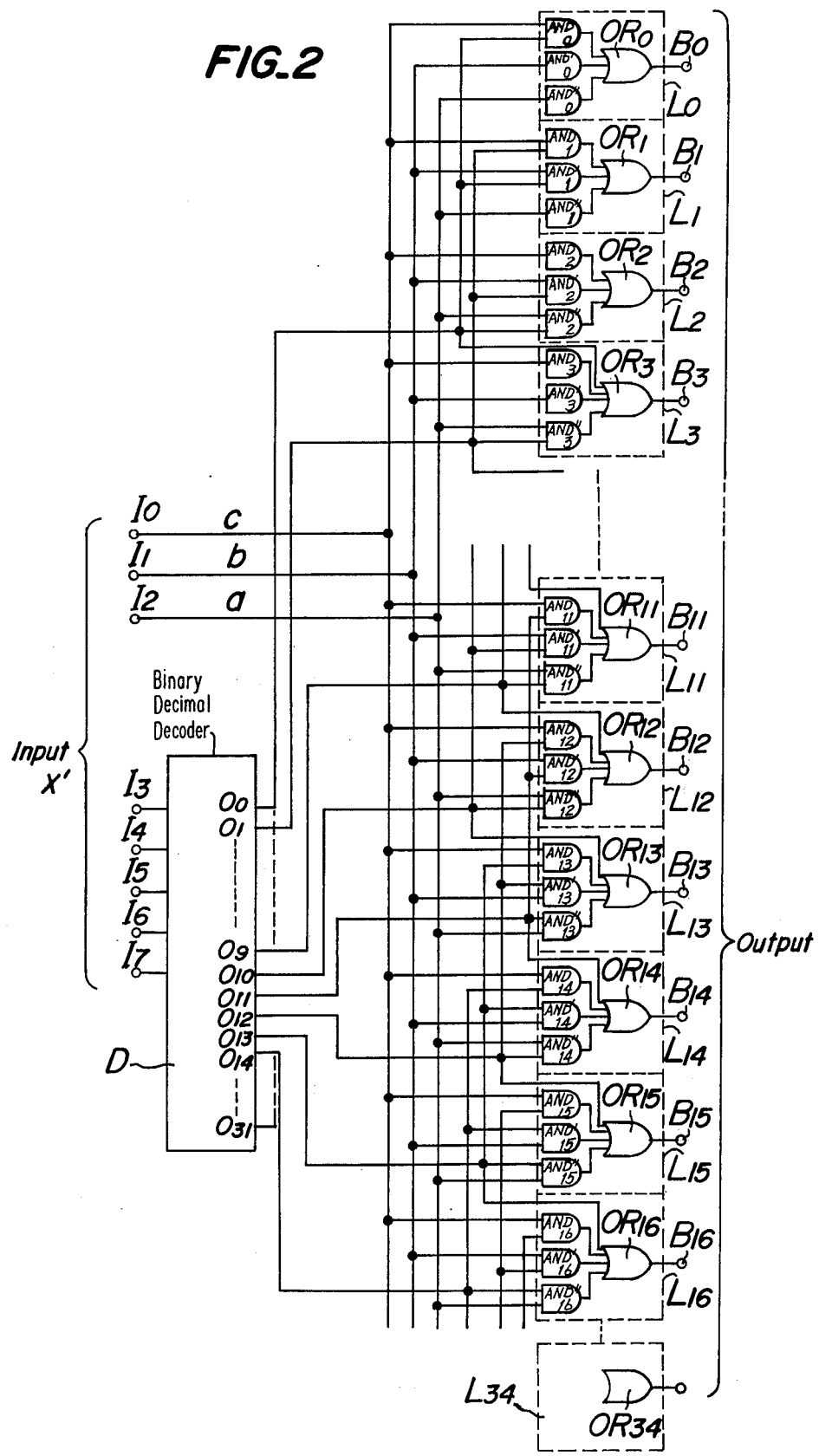
FIG. 2 is a block diagram of another embodiment of digital antilogarithmic converter circuit according to this invention.

In FIG. 2 which shows a second preferred embodiment of this invention, C is a circuit comprising a series of logic circuits $L_0-L_{34}$ for producing a linear approximation of the number less than the decimal point of the input $x'$ at bit output terminals corresponding to an antilogarithmic number of the number more than the decimal point of the input $x'$. Each of the logic circuits comprises first, second and third AND gates AND, AND' and AND'' which are connected to input terminals $I_0$, $I_1$ and $I_2$ for receiving the low-order three bits of the input $x'$, respectively. The high-order five bits of the input $x'$ at input terminals $I_3-I_7$ are applied to binary-decimal decoder circuit D, which decods these five bits to supply an antilogarithmic conversion decimal number 0–31 of the number more than the decimal point of the input $x'$ at a corresponding output terminal $O_0-O_{31}$.

The successive one $O_i$ of the output $O_1$–$O_{31}$ is connected in common to the first, second and third AND gates $AND_i$, $AND'_{i+1}$, $AND''_{i+2}$ included in the successive three logic gate circuits $L_i$, $L_{i+1}$ and $L_{i+2}$, respectively, and also connected to an OR gate $OR_{i+3}$ in the $i+3$-th logic circuit $L_{i+3}$. For example, as shown in FIG. 1, the decoded output $O_{12}$ is connected to the first, second and third AND gates $AND_{12}$, $AND'_{13}$ and $AND''_{14}$ included in the successive three logic circuits $L_{12}$, $L_{13}$ and $L_{14}$ and also connected to the OR gate $OR_{15}$ in the 15th logic circuit $L_{15}$. The outputs of the AND gates $AND_i$, $AND'_i$ and $AND''_i$ in each logic circuit $L_i$ are also applied to the related OR gate $OR_i$.

Thus, when it is assumed that the bit inputs at the input terminals $I_3$–$I_7$ are "0 1 1 0 0", "1" appears only at the output terminal $O_{12}$ of the decoder, as a result of which if the bit inputs at the input terminals $I_0$–$I_2$ are "$c\ b\ a$", "$c$", "$b$"and "$a$" appear at bit output terminals $B_{12}$, $B_{13}$ and $B_{14}$ of the corresponding successive three logic circuits $L_{12}$, $L_{13}$ and $L_{14}$, respectively and "1" appears at an bit output terminal $B_{15}$ of the logic circuit $L_{15}$. That is, the binary bit outputs "1 $a\ b\ c$" representing the linear approximation of the number less than decimal point of the input $x'$ are produced at the bit output terminals of the successive four logic circuits selected by the output of the decoder and hence corresponding to the antilogarithmic number of the number more than the decimal point of the input $x'$. This means that the linear approximation of the number less than decimal point of the input $x'$ is multiplied by the antilogarithm of the number more than the decimal point. Accordingly, in this embodiment the circuit C comprises a combination of a linear approximation circuit and a multiplication circuit.

The following Table II shows the bit outputs for various inputs $x$.

Table II

| Row No. | Bit Inputs ($x'$) 7 6 5 4 3 2 1 0 | Bit Outputs 34 33 ... 13 12 11 10 9 8 7 6 5 4 3 . 2 1 0 |
|---|---|---|
| 1 | 0 0 0 0 0 a b c | 0 0 ... 0 0 0 0 0 0 0 0 0 1 a b c |
| 2 | 0 0 0 0 1 a b c | 0 0 ... 0 0 0 0 0 0 0 0 1 a b c 0 |
| 3 | 0 0 0 1 0 a b c | 0 0 ... 0 0 0 0 0 0 0 1 a b c 0 0 |
|  |  | decimal ↑ point when $X_s = 0$ |
| 4 | 0 0 0 0 0 a b c | 0 0 ... 0 0 0 0 0 0 0 0 0.0 1 a b c |
| 5 | 0 0 0 0 1 a b c | 0 0 ... 0 0 0 0 0 0 0 0 1 a b c 0 |
| 6 | 0 0 0 1 0 a b c | 0 0 ... 0 0 0 0 0 0 0 1 a b c 0 0 |
|  |  | decimal ↑ point when $x_s = 3$ |

From Table II it is apparent that the circuit of FIG. 1 produces the linear approximation of the number less than the decimal point of the input $x'$ on bit output locations corresponding to the antilogarithmic value of the number more than the decimal point of the input $x'$. Therefore, when $x_S$ is zero, the decimal point of the bit outputs of the circuit is considered to be positioned on the right of the bit output $B_{13}$ so that the bit outputs represent $Z=2^x$. In an example of a first row of the Table II, if the low-order three bit inputs "$a\ b\ c$" representing the number less than the decimal point of the input $x'$ is "100"($=0.5$) and the high-order five bit inputs representing the number more than the decimal point of the input $x'$ are all "0", the resultant bit outputs are "1.100"($=1.5$) and thus the desired linear approximation $Z=2^{0.5}\approx 1+0.5=1.5$ is obtained. In an example of a second row of the Table II, if the low-order three bit inputs "$a\ b\ c$" are "100" and the high-order five bit inputs are "0 0 0 0 1", i.e. if the input $x'=1.5$, the resultant bit outputs are "11.000"($=3.0$) as can be seen from an output column of the Table II and thus the desired linear approximation $Z=2^{1.5}\approx 2\times(1+0.5)=3$ is obtained.

On the other hand, when $x_S$ is not zero, the linear approximation of Z can be correctly obtained by only shifting the decimal point of the resultant bit outputs to left by the number $x_S$. For example, when $x_S=3$, the decimal point should be considered to be shifted to left by three digits from the decimal point when $x_S=0$ and hence is positioned on the right of the bit output $B_6$. In an example of a fourth row of the Table II, if "$a\ b\ c$"="100" and $x'=0.5$, the resultant bit outputs $B_6$–$B_0$ are "0.001100"=0.1875 and thus the desired linear approximation $Z=2^{x'-3}=2^{-2.5}=2^{-3}.2^{0.5}\approx\frac{1}{8}(1+0.5)=0.1875$ is obtained. The same applies to the other values of i $x'$. In this way $x$ can be operated as positive number ($x'$) even if $x$ is negative.

From the anti-logarithmically converted digital information thus obtained a required shutter speed signal in a camera can be obtained by means of, for example, a suitable counter circuit.

Figure 3:
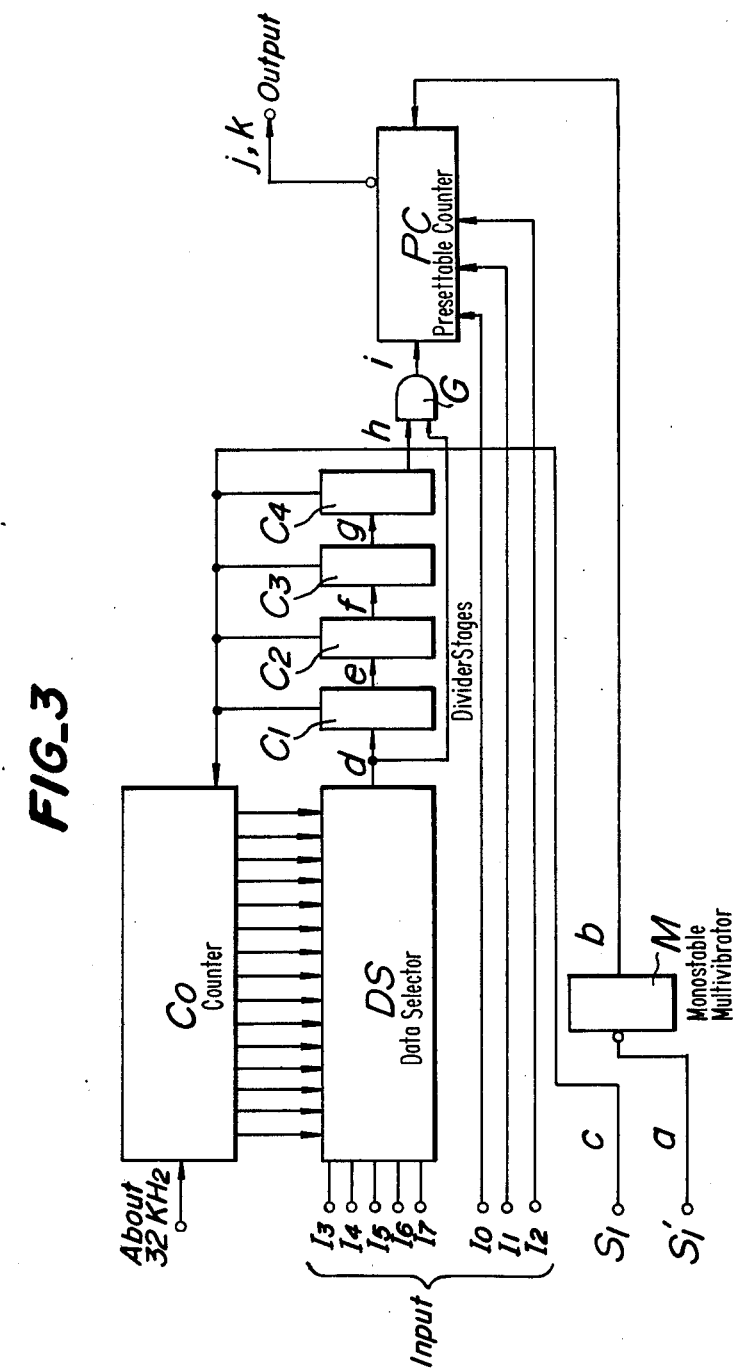
FIG. 3 is a block diagram of a shutter speed control circuit including another form of a digital antilogarithmic converter circuit according to this invention.
Figure 4:
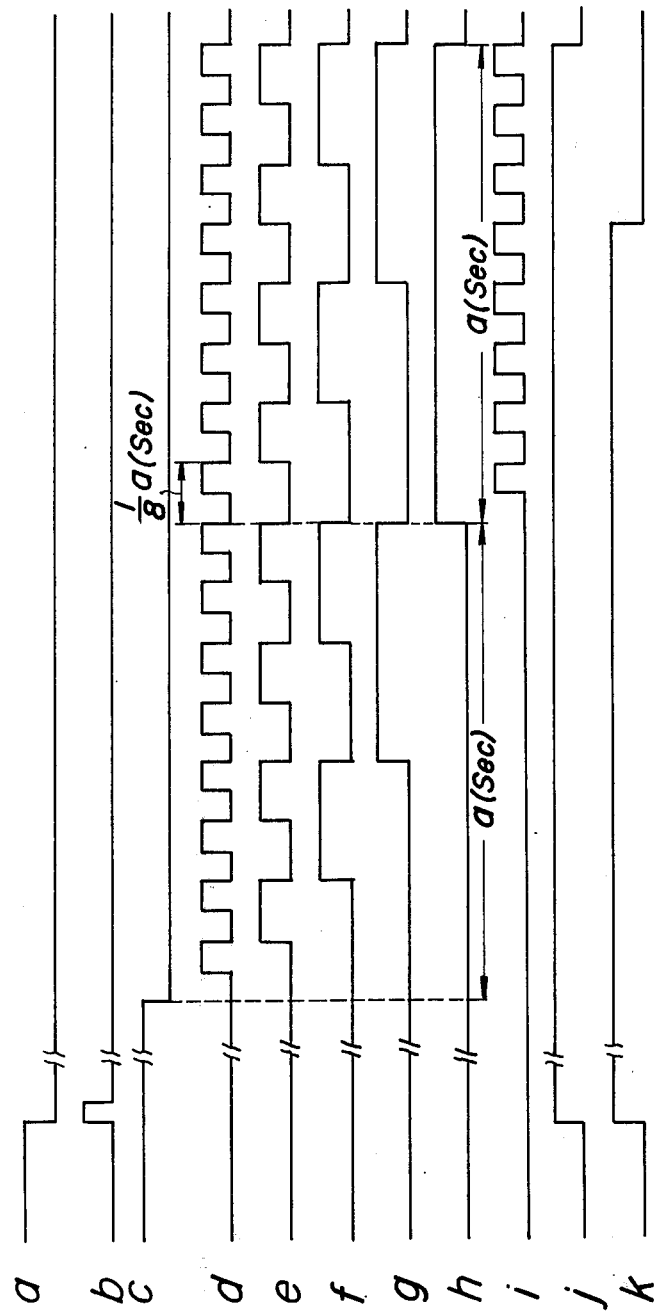
FIG. 4 shows waveforms at various points of the circuit of FIG. 3 for explaning the operation thereof.

FIG. 3 shows a circuit according to this invention for receiving the logarithmically converted digital information and directly producing a shutter speed signal having a period corresponding to an antilogarithm of the received digital information. FIG. 4 shows the various wave forms of the signals in the device shown in FIG. 2.

In FIG. 3, $S_1$ is a shutter start signal (FIG. 4c) which, for example in case of a focalplane shutter, is a frontplane start signal. $S_1'$ is a shutter depressed signal (FIG. 4a) which is generated in advance of the signal $S_1$ by means of, for example, a switch associated with a shutter release button. $C_0$ is a counter for counting clock pulses of a predetermined frequency, for example of 32,768 Hz to provide outputs of various divided frequencies, for example of 32,768 Hz, 16384 Hz, ... ½ Hz. DS is a data selector which has input terminals $I_3$–$I_7$ for receiving the high-order five bits of the digital information $x$ to be converted and selects a particular one of the divided frequency outputs 32768 Hz, ... ½ Hz of the counter $C_0$ in accordance with the received information. $C_1$–$C_4$ are divider stages which are enabled by the shutter start signal $S_1$ and successively divide the frequency signal (FIG. 4d) selected from the data selector DS by a factor of 2 to produce a signal having a period of $2a$ seconds corresponding to a shutter speed for the magnitude of that part of the input $x$ which is larger than the decimal point (see FIG. 4e–4h). PC is a presettable four bit counter, in which prior to the enabling of counter $C_0$ and divider stages $C_1$–$C_4$ the low-order three bits of the input $x$ from the input terminals $I_0$–$I_2$ are presetted by an output pulse (FIG. 4b) from a monostable multivibrator M. G is an AND circuit having two inputs connected to the input of the divider stage $C_1$ and to the output of the divider stage $C_4$, respectively, the output of this circuit being applied to the presettable counter PC as a clock signal. As shown in FIG. 4i, this clock signal appears during the latter half of the period and has a period equal to $a/8$ seconds. If the low-order three bits of the input $x$ presetted in the presettable counter PC are all "0", the inverted output on the fourth bit location of the counter PC becomes "0" upon eighth pulse of the clock signal of FIG. 4i (see FIG. 4j) and the longest shutter open signal of $2a$ seconds is obtained. If the presetted low-order three bits are "0 1 1", said output of the counter C becomes "0" upon the fifth pulse of said clock signal and a shutter open signal of 1⅝$a$ seconds is obtained. Therefore, the resultant shutter open signal has a desired shutter open period from $a$ to $2a$ seconds in accordance with the number less than the decimal point of the input $x$.

In the foregoing description, this invention is described with reference to a particular embodiment for anti-logarithmically converting a logarithm $x$ of $2^x$, but it is obvious that this invention can be applied to an antilogarithmic conversion of any logarithm.

What is claimed is:

1. A circuit for receiving logarithmically converted digital information and producing a signal having a period in reverse proportion to an antilogarithmic value of said digital information comprising:
   - a counter for counting a clock pulse of a predetermined frequency to provide various divided frequencies;
   - a data selector for receiving the number more than decimal point of the digital input information and selecting a particular one of the various divided frequencies from said counter in accordance with the received number;
   - a divider for dividing the selected frequency from said selector to provide a signal having a period related to the antilogarithmic value of the number more than the decimal point of the input information;
   - an AND circuit having two inputs connected to the input and output of said divider, respectively; and
   - a presettable counter which is presetted to the number less than the decimal point of the input information by a start signal and for then receiving as clock pulses the output pulses from said AND circuit to produce an output signal having a period in reverse proportion to the antilogarithmic value of the input information.

* * * * *